United States Patent [19]

Lanier

[11] 3,925,448

[45] Dec. 9, 1975

[54] PROCESS FOR PRODUCING NITRILOTRIACETONITRILE

[75] Inventor: Carroll W. Lanier, Baker, La.

[73] Assignee: Ethyl Corporation, Richmond, Va.

[22] Filed: Sept. 30, 1970

[21] Appl. No.: 76,812

[52] U.S. Cl. .................... 260/465.5 A; 260/465.4
[51] Int. Cl.² ................................. C07C 121/43
[58] Field of Search ..................... 260/465.5 A

[56] References Cited
UNITED STATES PATENTS

| | | | |
|---|---|---|---|
| 2,855,428 | 10/1958 | Singer et al. | 260/465.5 A |
| 3,061,628 | 10/1962 | Singer, Jr. et al. | 260/465.5 A |
| 3,337,607 | 8/1967 | Wollensak | 260/465.5 A |
| 3,504,011 | 3/1970 | Gandhi | 260/465.5 A |
| 3,515,742 | 6/1970 | Morgan et al. | 260/465.5 A |
| 3,637,799 | 1/1972 | Herz | 260/465.5 A |
| 3,679,728 | 7/1972 | Morgan et al. | 260/465.5 A |
| 3,679,729 | 7/1972 | Daniels | 260/465.5 A |

*Primary Examiner*—Joseph P. Brust
*Attorney, Agent, or Firm*—Donald L. Johnson; John F. Sieberth; Shelton B. McAnelly

[57] ABSTRACT

It is disclosed that nitrilotriacetonitrile can be produced in improved yield and purity and at a rapid rate from ammonium sulfate, formaldehyde and hydrogen cyanide by employing a particular order of combination of reactants and maintaining certain critical temperature conditions during the combination and in other portions of the process and while avoiding the presence of HCN vapor in the system. It is disclosed that undesired color frequently encountered in nitrilotriacetonitrile and in derivatives thereof such as trisodium nitrilotriacetate monohydrate and aqueous solutions thereof can be avoided to a large extent without requiring inordinately long processing periods. When using the proper sequence of combination and conditions, the reactants can be combined directly in about stoichiometric proportions without deliberately prolonging or extending the period of addition of reactants. An important aspect of the process is avoiding the presence of free hydrogen cyanide and maintaining a vapor free reaction system until substantially all free HCN is reacted.

11 Claims, 3 Drawing Figures

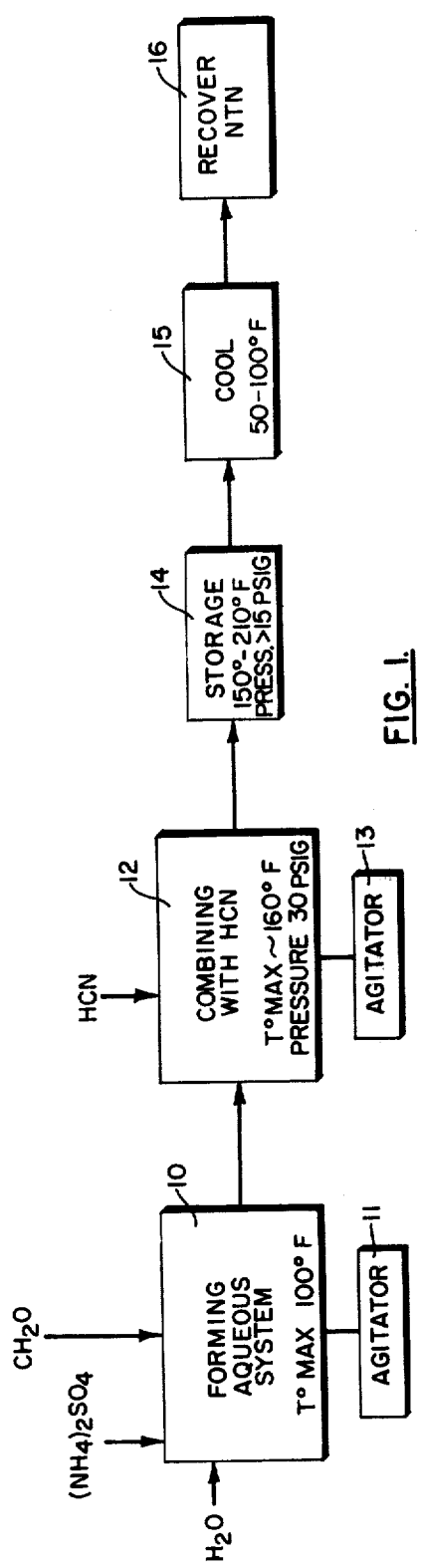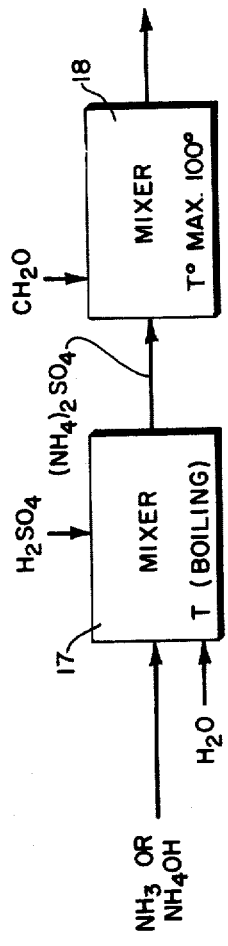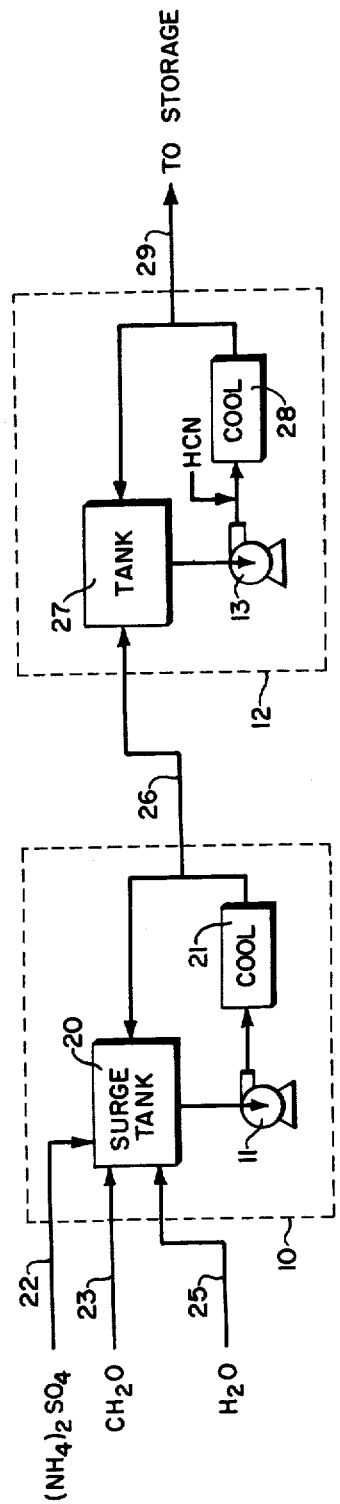

PROCESS FOR PRODUCING NITRILOTRIACETONITRILE

BACKGROUND OF THE INVENTION

1. Field of the Invention

The invention relates to the manufacture of amino nitriles and in particular to the manufacture of nitrilotriacetonitrile.

2. Description of the Prior Art

The general preparation of amino nitriles such as nitrilotriacetonitrile from reactants involving formaldehyde, ammonia and hydrogen cyanide has been well known in the art for many years. U.S. Pat. Nos. 2,855,428 and 3,061,628 are typical of such processes. These patents involve a deliberate prolonged addition of the ammonia to the other reactants causing the HCN to be at reaction temperature for a prolonged period. The reaction is dependent upon fairly critical conditions; in particular, identity, proportions and order of addition of reactants, diluent water, pH and temperature. If conditions vary by even comparatively small amounts in some respects, undesired side reactions occur to produce by-products thereby lowering the purity and yield of the desired products.

Maintaining the proper pH in systems feeding hydrogen cyanide and ammonia is particularly difficult. At one time it was considered necessary to employ carefully proportioned feed of a strong acid such as sulfuric acid and continual measurement and manipulation of pH. For the most part, the pH control problem was vastly simplified by feeding a salt of ammonia and the strong acid, viz. ammonium sulfate, as taught in U.S. Pat. Nos. 3,337,607. Another important aspect of U.S. Pat. No. 3,337,607 is its teaching of a new order of addition of the reactants in such a hydrogen cyanide feeding system involving: 1 — the formation of an intermediate system by preliminarily combining the ammonium salt with formaldehyde in an acidic aqueous system with or without co-feed of free ammonia to produce open-chained intermediates as distinguished from complex cyclic amines such as hexamethylenetetramine, and 2 — the combination of the intermediate system with the hydrogen cyanide.

Control of proportions, temperatures and reaction rates has been a characteristic problem of prior art in the general area of producing nitrilotriacetonitrile. in the past in much of the art it was considered necessary to resort to slow feeding of a rate limiting reactant, which for the most part was ammonia or an amine added to a large bulk of a HCN containing system, to avoid "runaway reactions" or to use what is termed "adiabatic" operation with large quantities of diluent water as a heat sink. U.S. Pat. No. 3,515,742 discusses the diluted type of operation.

Associated with the problem of control are the aspects of measurement of reactant and product compositions and concentrations and proportioning of feed of reactants, all of which have led much of the prior art to employ prolonged batchwise operations and intermittent feeds with attendant inherent wide fluctuations of compositions and proportions of reactants over the period of each batch. Some results of such operation are slow overall reaction rates and a difficulty of determining the precise end point for addition of the limiting reactants tending to require the feeding or maintenance of one or more reactants in excess, usually considerable excess. Such characteristics tend to give rise to poor yields and/or recovery problems connected with the excess reactant or excess diluent water, and the like.

Accordingly, it is an object of the present invention to provide a process for producing amino nitriles in high yield and high purity.

Another object of the present invention is to provide a process for producing amino nitriles wherein one of the reactants is hydrogen cyanide and another is ammonium sulfate.

An object of the present invention is to proide a continuous process for producing aminonitriles by reaction of ammonium sulfate, formaldehyde and hydrogen cyanide wherein the reactants are fed in about stoichiometric proportions without the need for prolonged addition of reactants.

Another object of the present invention is to provide a process of the class described for producing nitrilotriacetonitrile in excellent yield and purity by feeding liquid hydrogen cyanide under conditions wherein a substantially complete reaction thereof to intermediates apparently occurs virtually instantly during an initial combining operation without restriction imposed by a deficiency of the other reactants and without the formation of vapor spaces containing hydrogen cyanide.

Another object of the present invention is to provide a process for producing nitrilotriacetonitrile from ammonium sulfate, formaldehyde and hydrogen cyanide wherein the hydrogen cyanide is reacted in a two stage reaction system in which it is rapidly added to a liquid-full mixing system maintained at a pressure above the vapor pressure of HCN at the temperature to produce intermediates and wherein the mixture of intermediates from said mixing system is post-reacted for a prolonged time at a temperature from about 120°F to about 250°F and a pressure from about 15 to about 200 psig.

Other and further objects and features of the present invention will become apparent upon a careful consideration of the following discussion and accompanying drawing, wherein:

FIG. 1 is a block diagram of an overall process for producing nitrilotriacetonitrile in accordance with the present invention.

FIG. 2 shows a preferred process for preliminarily combining all FIG. 1 reactants except HCN.

FIG. 3 shows preferred short contact time, low hold-up combining systems for adding the $CH_2O$ and the HCN of the process of FIG. 1.

SUMMARY OF THE INVENTION

The present invention relates to a process for producing nitrilotriacetonitrile NTN by first forming an aqueous system of formaldehyde ($CH_2O$), ammonium ion $(NH_4)^+$ and sulfate ion $(SO_4)^{--}$ wherein the mol ratio of formaldehyde to ammonium ion $(NH_4)^+$ is about stoichiometric for an overall reaction of 3 molecules each of hydrogen cyanide (HCN) and formaldehyde ($CH_2O$) with one equivalent of ammonium ion $(NH_4)^+$, that is, from about 2.9 to about 3.1 mols each of formaldehyde and hydrogen cyanide per unit of $(NH_4)^+$ ions, preferably about 3:1, and wherein the mol ratio of sulfate ion $(SO_4)^{--}$ to ammonium ion is from about 0.175 to about 0.5. Where all of the $(NH_4)^+$ ions and $(SO_4)^{--}$ ions are supplied as $(NH_4)_2SO_4$, this is equivalent to six mols of $CH_2O$ and six mols of HCN per mol of $(NH_4)_2SO_4$ with a $(SO_4)^{--}/(NH_4)^+$ ionic ratio of 0.5. Where the $(NH_4)^+$ is fed half as $(NH_4)_2SO_4$ and half as ammonia or ammonium hydroxide, the $(SO_4)^{--}/(NH_4)^+$ ratio is 0.25, a preferred ratio.

The forming operation is conducted at a temperature from about 50° to about 120°F, preferably about 85°–95°F, typically 95°F. The aqueous system contains from about 50 to about 80 percent water by weight, preferably about 64 percent. The reactions at the forming step occur rapidly, virtually instantaneously on contact, with vigorous mixing. The reactions are generally allowed to proceed to substantial completion.

A significant feature of the process is that when this forming step is performed using reactants wherein the $(SO_4)^{--}/(NH_4)^+$ ratio is from about 0.2 to about 0.35, preferably 0.25, the overall yield of the process is especially high. The preferred ratio of 0.25 is achieved typically when using a feed ratio of 1 mol of $(NH_4)_2SO_4$ per 2 mols of $NH_4OH$, $NH_3$, or a mixture of $NH_4OH$ and $NH_3$. Alternately, it is attained when feeding $(NH_4)_2SO_4$, $H_2SO_4$, $NH_3$, $NH_4OH$, $H_2O$ and $CH_2O$, separately or in appropriate combinations of two or more. Preferably, systems containing $(NH_4)^+$ and $CH_2O$ including the effluent from step 10 fed to the succeeding step 12 are not allowed to have a basic pH and are preferably no more basic than a pH of 2.0. A particularly preferred combination of feeds to the forming step includes three separate streams of (1) about 30–50 percent aqueous solution of $(NH_4)_2SO_4$, (2) about 30–50 percent aqueous solution of $CH_2O$, and (3) $NH_3$ or $NH_4OH$.

As a subsequent step in the process, the aqueous system from the forming step is reacted with about a stoichiometric amount as set forth in the foregoing of hydrogen cyanide (HCN) relative to the other reactants of the aqueous system from the forming step. This reacting step is performed while maintaining the resultant system in a vapor free state at a pressure from about 30 psig to about 200 psig, typically about 30–50 psig, at a reaction temperature from about 120° to about 250°F. The reacting operation is conducted in a liquid-full reaction system which condition is maintained in all subsequent portions of the apparatus as long as any significant amount of residual HCN is present. The HCN is suitably fed as a 99 percent purity liquid.

Preferably the initial portion of the reacting by the HCN is conducted in a well-agitated system having a small volume hold-up particularly when the feed components are in stoichiometric proportions and are well mixed in the reacting step. For proper overall operation, it is particularly important to maintain a steady, uniform flow of the $CH_2O$ feed to the forming step otherwise the system may go basic at step 12 resulting in a condition conductive to an uncontrollable polymerization of HCN causing the development of high pressures, high temperatures, color bodies, line pluggage, etc.

Where the mixing of the step 12 in its entirety or initial portion is gentle, the step is desirably prolonged for a period up to about 15 minutes or even longer up to about six hours as necessary to produce substantially complete reaction to NTN in a single step reaction. It is preferred that a prolonged contacting or any portion of the contacting above about 210°F be in a second stage, a subsequent "storage" reacting stage or step described hereinafter which can be at a higher temperature than the range specified for the combining-reacting step and which is suitably conducted with moderate agitation incidental to the control of crystallization of NTN and such ancillary aspects.

One aspect of the process is that the HCN reacting step or steps and the preceding forming step where the other reactants are preliminarily combined need not be prolonged for heat removal or other purposes except for what is needed for thorough mixing and that no excess diluent is required for heat sink purposes. Preferably, the reacting step is initiated in a virtually instantaneous combining-reacting basis in a well agitated and well cooled system. A preferred method of combining-reacting for at least the first portion of the reacting step is in a pump recirculation loop. An important aspect of the reacting step of the process is avoiding vapor spaces and pump cavitation where unreacted HCN can exist as a vapor. It appears that a hitherto unrecognized source of undesired side reactions is polymerization of HCN in vapor spaces which is avoided by deliberately maintaining a liquid-full system at this step particularly in pumps, surge tanks, etc. This step is provided with means for cooling to prevent the development of excessive temperatures because above about 175°F for the initial reacting side reactions become more troublesome. Where the initial portion of the reaction is performed in a combining-reacting stage and the prolonged contacting is in a subsequent storage-reacting stage, the contacting-reacting is preferably at a temperature from about 140° to about 160°F, typically about 155°F.

The requirement for a liquid-full HCN system which is vapor free necessitates operation at a pressure at least above the vapor pressure of HCN at the temperature of the combining-reacting operation, from about 30 to about 200 psig. Higher pressures ordinarily are not required unless pump or other agitator cavitation is encountered at the higher regions of the temperature ranges specified. The precise nature of the reactions of the combining-reacting step is not known but it appears to involve virtually an instantaneous reaction of most of the HCN under the conditions discussed with limitation as regards rate imposed mainly by the contact or mixing characteristics of the system.

Where the first stage combining-reacting operation is of a short duration up to about 15 minutes, preferably the resultant system is allowed to react further in a second step "storage-reacting" stage of reacting for a generally longer period at a temperature in the range from about 120°F to about 250°F, preferably from about 175 to about 200°F. The length of time for this second reacting step is in general inversely related to the temperature and may extend for a period of time from about 1 minute at the higher temperatures to about 6 hours at lower temperatures, to provide the time required to bring about virtually complete reaction of the intermediate reactants to produce the product nitrilotriacetonitrile. Generally speaking, a time from about 1 hour to about 3 hours and temperatures of about 175°–200°F are preferred, with 2 hours being typical. One preferred aspect of the process is that this subsequent storage-reacting step which follows the initial HCN combining-reacting step is distinct therefrom and is preferably performed at a higher temperature than the combining-reacting step, particularly where minimum color of product is desired. Inasmuch as most of the HCN added to the other reactants reacts very rapidly as added in the combining-reacting step if stoichiometric proportions of the reactants are fed and if HCN is not in excess or permitted to accumulate in a vapor space, superatmospheric pressures are less important in the storage-reacting step; however, it is preferred to maintain liquid-full conditions in the storage-reacting step also to minimize problems caused by process upsets and polymerization in vapor spaces, particularly when a slight excess of HCN is fed relative to either $(NH_4)^+$ or $CH_2O$. Crystallization of nitrilotriacetonitrile generally begins in the second stage storage-reacting operation and may in fact be desirably nearly complete at this point, hence it is usually desirable to maintain at least moderate agitation in the storage-reacting step operation to prevent congealing or accumulation of large masses of crystals. Like the first stage combining-reacting step, this second stage storage-reacting step is provided with effective cooling to remove heat of reaction. In this instance, the crystallization problem makes it desirable to use heat exchangers in a pump recirculation loop to provide additional high intensity mixing, and maintain high velocities to prevent crystal deposition or accumulation. When the process is performed as preferred, the heat removal load is approximately the same in the first combining-reacting step as in the subsequent storage-reacting step.

The NTN solution can be used directly as by reaction with NaOH to produce the sodium salt of nitrilotriacetic acid. A preferred procedure is to recover NTN in solid form by a suitable procedure such as discussed hereinafter.

Following the second stage storage-reacting, the reacted system is cooled if necessary to a temperature sufficiently low to facilitate virtually complete separation of nitrilotriacetonitrile. Inasmuch as nitrilotriacetonitrile is poorly soluble in water at temperatures below about 95°C, it is generally necessary to perform the cooling operation as a deliberate step only in instances wherein the preceding step was at a temperature close to the upper portion of the range indicated for that step. On the other hand, in general, it is desired to minimize solubility losses of nitrilotriacetonitrile product by cooling the effluent from the storage operation to a temperature of about 100°F or lower even to about 50°F, particularly when low cost cooling to such lower temperatures is readily available.

Following the precipitation of the nitrilotriacetonitrile, it is usually desired to remove the crystallized product from the mother liquor. This particular separation is readily accomplished in any of several different ways, for example, filtration, decantation or centrifuging or combinations of such operations.

Separated nitrilotriacetonitrile is then used in any conventional way, typically hydrolysis with alkali metal hydroxide such as NaOH, or KOH to produce trisodium nitrilotriacetate or tripotassium nitrilotriacetate, respectively. Such salts are useful detergent materials.

With reference now to FIG. 1 of the drawing, the block diagram shown therein indicates a preferred embodiment of the process of the present invention. The forming step (a) of the process is performed at 10 and involves the combining of three principal feed materials, ammonium sulfate, formaldehyde and water. In general, the ratio of the formaldehyde and the ammonium sulfate feed is such as to provide a preferred 3:1 molar ratio between formaldehyde and ammonium ion or equivalent (6:1 mols of formaldehyde:mol ammonium sulfate). As a practical matter, the mol/ion ratio may vary from about 2.9:1 to about 3.1:1 depending upon other considerations in the overall system.

The temperature of the operation 10 is limited by the necessity to avoid side reactions such as polymerization making it desirable to limit the maximum temperature of the forming operation 10 to about 100°F. This limitation is not rigid; however, because in those instances where the forming is performed quickly and with small hold-up as hereinafter described in connection with FIG. 3 it is ordinarily permissible to exceed the desired maximum of 100°F by as much as about 20°F. The temperature of the forming step thus is from about 50° to about 120°F with one more preferred range being about 85°–95°F, another preferred range being 95°–120°F for brief contact mixing of the order of 5 minutes flow liquid content of the mixing system 10.

The forming system 10 is shown as having an agitator 11 which provides efficient and effective mixing of the components fed to the step and which generally is vigorous to permit the use of small systems with small hold-up (such as 5 minutes or less), typically pump recirculation loops.

The concentration of water in the aqueous system at 10 and the amount of water fed at that point is determined to a large extent by the concentration of reactants desired for the succeeding steps which will be discussed in further detail hereinafter. The forming step 10 generally conveniently receives an aqueous solution of formaldehyde of a concentration from about 30 percent to about 50 percent by weight formaldehyde. The ammonium sulfate feed is preferably in the form of a concentrated solution for ease of handling and control, particularly in those instances where small hold-up is desired. Alternately, in appropriate circumstances the ammonium sulfate is fed in a solid form in which case the forming operation 10 includes the operation of dissolving the solid ammonium sulfate.

In the event that there is insufficient water fed with the formaldehyde and ammonium sulfate reactants to satisfy the requirement for the subsequent step 12, or for dissolving the ammonium sulfate, make-up water is supplied separately to the operation 10 as indicated in the figure.

Alternately, the ammonium sulfate fed to the operation 10 is substituted by the feed to 10 of appropriate quantities of ammonia and sulfuric acid wherein the ammonia fed is in either the anhydrous form or the hydroxide form or in a mixed form. This type of operation connected with the feed of sulfuric acid is discussed in further detail in connection with FIG. 2. Heat transfer economies are possible when performing the operation 10 in two steps where sulfuric acid and ammonia are fed separately. In general, it is desired that the ammonia and sulfuric acid be fed in such proportions that avoid the resulting presence of free acid in the forming step 10 but which avoids the existence of a basic condition in 10.

The stream from the forming step 10 is delivered to the combining-reacting step 12 at which point an approximately stoichiometric amount of hydrogen cyanide, preferably about 3 mols of liquid hydrogen cyanide per mol of ammonium ion or equivalent, is added to the system. It is characteristic of this reaction system that the liquid hydrogen cyanide reacts with the liquid from 10 almost instantly upon contact at (b) to the desired extent to minimize adverse side reactions that would occur at the higher temperature of the subsequent step (c).

Reaction at this point (b) occurs rapidly even in a system having small volume, the normal limiting factor being primarily the matter of mixing and the attainment of thorough contact between the reactants. An important aspect of this step of the process is the maintenance of a system which is free of vapor spaces and pockets or cavities within the liquid in all points where the hydrogen cyanide is freshly fed to prevent the existence of hydrogen cyanide vapor in such spaces. Under the conditions of temperature that prevail at 12, it appears that hydrogen cyanide undergoes side reactions, apparently including polymerization, when in concentrated form in vapor spaces. The result of the polymerization is the production of by-product materials that contaminate the desired product. Contamination manifests itself in various ways such as the development of undesired color or odor or the production of solid deposits that progress to such an extent as to cause pluggage of lines and other portions of the apparatus.

Accordingly, the combining-reacting operation (b) of step 12 is performed in a liquid-full system which is vapor free and which therefore is at a pressure somewhat higher than the sum of the partial pressures of the materials present to prevent the existence of hydrogen cyanide vapor within the system. Additionally, the system 12 preferably is also supplied with vigorous agitation by agitator 13 which seeks to attain a rapid and efficient contacting between the feed materials to permit the full reaction of the liquid hydrogen cyanide virtually as fast as it is fed to the system, normally within a matter of seconds or a fraction of a second. It is evident that, although the desired way of obtaining the intermediate reaction operation at 12 is in an almost instantaneous contacting to insure the quick conversion of the bulk of the hydrogen cyanide fed and for other reasons, there may be instances in which it is desired to deliberately prolong the operation such as in situations wherein coordination with flows within and to or from auxiliary equipment is necessary. One of the important factors in connection with the operation at 12, however, is that the operation is not deliberately prolonged for purposes of slowing the initial reaction rate or the rate of addition of the limiting reactant at that point, or for heat removal considerations. Thus, this step of the process is provided with efficient and effective cooling to whatever extent is necessary to maintain the desired recited temperature conditions without need for limiting feed rates.

Following the initial combining-reacting (b) in the step 12, it is possible to operate at a higher temperature to complete the reactions that are involved to produce the final product NTN. Thus, a second step of reacting (c) of the system from step 12 is performed in a storage system 14 at which point a temperature higher than that of step 12 is maintained to increase the rate of desired reaction without the temperature limitations imposed upon the step 12 because of the feed of hydrogen cyanide to step 12. The pressure in the system at step 14 is not of limiting criticality and for all practical purposes is suitably atmospheric as far as the reactions that occur at that step are concerned. On the other hand, process upsets and flow irregularities may result in the presence of traces of hydrogen cyanide and of other materials having a vapor pressure greater than atmospheric at the temperatures involved making it desirable to conduct the operation at a modest super pressure above atmospheric, typically from about 15 lbs/psig up to about the pressure of the HCN addition step 12. The time of residence in the step 14 for substantially complete reaction to nitrilotriacetonitrile is dependent to a large extent upon the temperature, suitably ranging from about 10 minutes at the higher temperatures of the order of 210°F up to about 6 hours at the lower temperatures of the order of 150°F. A preferred combination is about 2 hours at a temperature of about 175°F.

With the preferred water concentration in the combining-reacting step 12 of from about 40 to about 70, typically 54 wt. percent; complete reaction produces a supersaturated solution of NTN at temperatures below about 95°C so that precipitation occurs readily in step 14 when below such temperatures or upon subsequent cooling. Typically, it is adequate to cool the system from storage step 14 to a temperature of the order of about 100°F at 15; however, in instances where it is desired to make more complete recovery of the nitrilotriacetonitrile from the solution, the solution is cooled to lower temperatures such as 50°F. Precipitated nitrilotriacetonitrile is readily recovered by a suitable recovery operation at 16 which typically involves decantation, centrifuging, filtration or various combinations of such operations.

With reference now to FIG. 2 of the drawing, an alternate arrangement for the forming step 10 (a) is shown. In FIG. 2, the step 10 of FIG. 1 is separated into two parts conducted at different temperatures. In the first step 17 of FIG. 2, ammonia and sulfuric acid are combined to produce ammonium sulfate. This operation is not particularly critical as to temperature and is quite exothermic. Temperature control is readily effected for this reaction by operation at reflux for the water that is involved; namely, at temperatures of about 220°F depending upon the pressures and the concentration of the solution. For the most part in a two-step operation as shown in FIG. 1, the desired form for the ammonium sulfate product is a solution and accordingly an appropriate amount of water is fed to step 17 either with the sulfuric acid or with the ammonia or both or separately as indicated. Typically, the ammonium sulfate is produced in an aqueous solution containing approximately 35 wt. percent ammonium sulfate. The ammonia fed to this step is preferably in at least a slight excess above stoichiometric for the acid fed to avoid the presence of free sulfuric acid in the effluent therefrom.

Following the mixer 17 of FIG. 2, the ammonium sulfate is fed to a second mixer 18. This mixer 18 is a well-agitated mixer similar to that identified by reference character 10 in FIG. 1. Here the same temperature limitations and considerations apply as discussed in connection with FIG. 1, viz. a temperature maximum of about 100°F with 120°F permitted for brief periods. Additional ammonia may be fed to mixer 18 either as $NH_3$ or $NH_4OH$; however, it is desired to avoid feeding so much ammonia at this point as to result in the production of a basic environment in mixer 18 or in step 10 of FIG. 1 in general. Thus, general requirements for mixer 18 and the forming step 10 are for the avoidance of free acid which magnifies pH problems and the avoidance of basic conditions which form undesired intermediates such as hexamethylene tetramine. By avoiding such extremes, control over uniformity of conditions is enhanced with resultant improvement in product purity and yield.

With reference now to FIG. 3 of the drawing, the apparatus shown therein uses pump recirculation loops for performing the operations at 10 and 12 of FIG. 1. Additionally, preferred apparatus for conducting all or part of the storage 14 is one or more such pump recirculation loops. The loop apparatus at 10 includes the pump 11 which corresponds generally to the agitator 11 of FIG. 1. The pump is followed in the loop by heat exchanger (cooler) 21 for removal of heat generated and a surge tank 20. This system provides a continuous recirculation system of low volume which is characterized by high flow rates and vigorous agitation within the body of the pump 11 providing thorough mixing without localized hot spots and also providing effective cooling. The pump 11 typically is a centrifugal pump. Other suitable pumps include gear pumps, helical pumps, vane pumps, and the like. The surge tank 20 is provided mainly to iron out composition variations due to fluctuations in the flow rate of feed materials and in suitable instances may be omitted. The requirement for avoidance of vapor spaces in the HCN regions is not applicable to this system 10.

Materials fed to the system 10 of FIG. 3 include ammonium sulfate fed through line 22, formaldehyde fed through line 23 and water when needed fed through line 25. It is, of course, understood that the water may be fed with either or both the other reactants in which case there is no need for separate feed as indicated except in start-up or in clean-out or other such operations. The cooler 21 is provided with adequate heat exchanger surface to maintain the desired temperatures that have previously been discussed in connection with the other figures. The brief contact arrangement of FIG. 3 permits operation of 10 at temperatures up to about 120°F, particularly in those instances where surge tank 20 is small or omitted so that the volumetric capacity of the system 10 is less than about a 5 minute flow of the feed through lines 22, 23 and 25. Because of the rapid flow within the system and the small holdup, the temperatures are nearly uniform throughout the system, another factor which permits generally higher measured temperatures to be used in a pump recirculation system. In general, the diameter of the piping and the internal cross-sections of the cooler and the pump 11 are proportioned on a basis of the desired flow rates and heat exchanger considerations using pipe sizes and corresponding pumps which may range from a fraction of an inch up to much larger sizes such as 4 to 6 inches.

The volumetric flow rate in the recirculation loop of 10 is from about 2 to about 20 times the combined volumetric feed rate to the loops from 22, 23 and 25.

The reaction which takes place at 10 is normally virtually an instantaneous reaction with completeness depending upon the adequacy of mixing and the ratio of feed of the reactants. Typically, for the stoichiometric feed of 3 mols of formaldehyde per "mol" of ammonium ion, and mixing of the type described, the reaction is virtually instantaneous providing an intermediate product system which is taken from the step 10 via line 26 and fed to step 12.

The apparatus shown within the dotted line 12 corresponding to the step 12 and agitator 13 of FIG. 1 uses a pump recirculation loop similar to that just discussed in connection with the step 10 including a circulating pump 13, a cooler 28, a surge tank 27. The feed line 26 is connected to tank 27 at the input of the pump 13. The liquid hydrogen cyanide is fed at the outlet side of the pump, a point of "increased" pressure within the system, this point of entry being utilized to avoid reduced pressures and minimize HCN "cavitation" problems within the pump which would be conducive to the formation of gaseous HCN within the pump itself. In general, the feed from 26 and the intermediates formed in 12 are less volatile than HCN. The heat exchanger 28 is provided with adequate heat transfer surface and cooling media to maintain the desired operating condition within the system 12.

The tank 27 is a surge tank only in the sense it is a composition equalizer. It is maintained in a liquid-full condition at all times as is the entire loop within the block 12. As discussed in connection with the step 10, the recirculation loop within 12 is proportioned on a basis of the pipe size, pump size and velocity considerations for the heat exchanger 28 and may range, generally speaking, from nominal pipe sizes of the order one-half inch up to larger sizes of the order of 4 to 6 inches, or more. It is evident that the residence time within the two reaction systems 10 and 12 in FIG. 3 can be very small with the most significant liquid volume holdup in each being the contents of the heat exchangers 21 and 28, respectively, plus the contents of the surge tanks 20 and 27, respectively, if such tanks are used. As with the recirculation loop of 10, the recirculation loop of 12 employs a volumetric flow rate of from about 2 to about 20 times the volumetric feed rate from line 26 and the HCN feed.

Discharge from the reaction system 12 is taken from a line 29 as shown which is preferably after the feed point for the hydrogen cyanide but before the feed point for the reactants from line 26. With a stoichiometric feed of the reactants as described and virtually instantaneous reaction of the HCN, the effluent at line 29 is substantially completely reacted to one or more intermediates produced by step 12 of FIG. 1. This intermediate material is delivered to the storage reacting system 14 as in FIG. 1 for the second step of the principal reaction.

Where the reacting-storage system 14 includes a recirculating loop similar to that of 12 in FIG. 3, the volume of the associated counterpart of the tank 27 is typically about equal to the feed volume of line 29 for a 20 to 120 minute period while the volumetric flow rate through the pump is adjusted to provide adequate heat transfer cooling to maintain the temperature specified and avoid the deposition of NTN within the pump-cooler system. Typical flow for the recirculating loop is about 10 percent of the volume of the counterpart of tank 27 per minute. The heat removal capability for the cooling provided for 14 ranges upward to about 50 percent of the total of the capability for 12 and 14.

The following example indicates preferred embodiments and aspects of the present invention and is presented in an exemplary, but not limiting sense.

EXAMPLE

Apparatus was set up as in FIG. 3 and FIG. 1. The loops 10 and 12 were constructed of ½ inch diameter tubing with a magnetic drive pump rated at 30 lb. head maximum and at 12 gallons per minute unrestricted flow. Friction losses in the systems actually limited recirculation to about 5–10 gallons per minute. The volume of each loop 10 and 12 was about 1 gallon.

The storage reaction system 14 employed three stirred pots, each of 5 gallon capacity, connected in series. The stirring was with variable speed magnetic driver stirrers variable over a range of 200–1000 rpm. Valves at the discharge of the storage reactors 12 and between 10 and 12 and between 12 and 14 provide for pressure control.

Each reactant is fed in liquid form from calibrated storage reservoirs maintained at sufficient pressure to provide reliable flow at the rates indicated. The cooling at 21, 28 and 14 is to hold the temperatures so as to avoid exceeding the selected temperatures.

In preferred operation according to the teachings of the present invention, the system was filled completely with water, pressured to about 30 psig, the agitation turned on, the system 12 brought to a temperature of 155°F by auxiliary heating not shown, and the feed of $CH_2O$ and $(NH_4)_2SO_4$ started. The temperature at 14 was set to 200°F. Temperature, pressure and pH conditions stabilized rapidly in 10 and then the feed of HCN was started at 12 when the pH of 10 dropped to about 2.0. The pressure in 12 was about 37 psig. Residence time in 14 was 1.0–1.5 hours.

The feed rates were: 37 wt. percent $CH_2O$ solution, 61 pounds per hour; 35 wt. percent $(NH_4)_2SO_4$, 47 pounds per hour; and 99 wt. percent HCN, 20 pounds per hour.

Effluent from 14 was collected at 15 over a 10–12 hour run period, then heated to 210°–220°F to redissolve crystals, then the mass was cooled slowly over a 3–5 hour period to form large crystals for good recovery by a centrifuge operation at 16. The slurry was centrifuged at 110°–120°F and the NTN product collected, weighed and analyzed.

NTN (melting point about 125°C, theoretical 128°C) was recovered at 16 in yield of about 90 percent of stoichiometric based on stoichiometric feed of all reactants. Most of the prior published data that indicate yields of the order of 95 percent or better are set forth with respect to ammonia as a limiting reactant and involves yields of 85–90 percent or lower with respect to the other reactants.

The mother liquor from the centrifuging operation was about 60 APHA, or a coloration similar to drinking water.

In comparative runs, start-up was with an empty system to which the reactant feeds were started. The set operating pressure for 14 was 17 psig and that for 12 was about 25 psig. The melting point of NTN recovered ranged from 73°–121°C and the mother liquor from the centrifuging operation was a wine color of about 600 APHA.

From the foregoing, it is obvious that numerous variations are possible within the scope of the invention as disclosed in the present specification and claims. It is obvious to those skilled in the art that specific descriptions are exemplary and that the invention is not to be limited except as defined in the claims.

I claim:

1. A process for producing nitrilotriacetonitrile which comprises:
    forming at a temperature of from about 50° to about 120°F an aqueous system of ammonium ion $(NH_4)^+$, sulfate ion $(SO_4)^{--}$ and formaldehyde wherein the ratio of mols of formaldehyde to ammonium ions is from about 2.9:1 to about 3.1:1, and the ratio of sulfate ions $(SO_4)^{--}$ to ammonium ions $(NH_4)^+$ is from about 0.175 to about 0.5, and reacting said system with hydrogen cyanide wherein the ratio of mols of (HCN) to the total ammonium ions $(NH_4)^+$ of said system is from about 2.9:1 to about 3.1:1 while maintaining the resultant system in a substantially liquid-full state at a reaction temperature of from about 120° to about 250°F and a pressure of from about 15 psig to about 200 psig, and while avoiding the presence of HCN vapor in the process, for a time of from about 10 minutes up to about 6 hours and sufficient to produce nitrilotriacetonitrile.

2. The process of claim 1 wherein the forming step is performed at a temperature from about 85° to about 95°F.

3. The process of claim 1 wherein the forming step is performed at about 95°F.

4. The process of claim 1 wherein the aqueous system of the forming step contains from about 50 to about 80 wt. percent water.

5. The process of claim 1 wherein the molar ratio of $CH_2O$ to $(NH_4)_2SO_4$ in the forming step is about 6:1.

6. The process of claim 1 wherein the reacting step is performed in a plurality of stages including (1) a combining-reacting first step performed at a temperature of from about 140° to about 160°F wherein substantially all the HCN is fed and (2) a subsequent storage reacting step performed at a temperature of from about 120°F to about 250°F for a period of from about 1 minute to about 6 hours and sufficient to produce nitrilotriacetonitrile.

7. The process of claim 6 wherein the combining-reacting step is performed at about 155°F.

8. The process of claim 6 wherein the mol ratio of $CH_2O$, $(NH_4)_2SO_4$ and HCN is 6:1:6, wherein the forming step is performed at a temperature of about 95°F, wherein the combining-reacting step is performed at a temperature of about 155°F and wherein the storage reacting step is performed at a temperature of about 175°F for about 2.0 hours.

9. The process of claim 1 wherein the mol ratio of $(SO_4)^{--}$ to $(NH_4)^+$ is about 0.25 and the stoichiometric ratio of $CH_2O$ to $(NH_4)^+$ to HCN is about 3:1:3.

10. The process of claim 1 wherein the reacting step is performed in a plurality of stages including (1) a combining-reacting first step performed at a temperature of from about 140°F to about 160°F and at a pressure of from about 30 to about 50 psig wherein substantially all the HCN is fed and (2) a subsequent storage reacting step performed at a temperature of from about 175° to about 200°F for a period of time of from about 1 hour to about 3 hours and sufficient to produce nitrilotriacetonitrile.

11. In a process for producing nitrilotriacetonitrile from ammonium sulfate, formaldehyde and hydrogen cyanide the improvement wherein the hydrogen cyanide is reacted in a two stage reaction system in which it is rapidly added to a liquid-full mixing system maintained at a pressure above the vapor pressure of HCN at the temperature to produce intermediates and wherein the mixture of intermediates from said mixing system is post-reacted for a prolonged time at a temperature of from about 120°F to about 250°F and a pressure of from about 15 to about 200 psig, and while avoiding the presence of HCN vapor in the process.

* * * * *